US010574400B2

(12) United States Patent
Lu et al.

(10) Patent No.: US 10,574,400 B2
(45) Date of Patent: Feb. 25, 2020

(54) METHODS AND DEVICES FOR ROBUSTNESS ENHANCEMENT IN A WIRELESS COMMUNICATION SYSTEM

(71) Applicant: TELEFONAKTIEBOLAGET LM ERICSSON (PUBL), Stockholm (SE)

(72) Inventors: Qianxi Lu, Beijing (CN); Zhan Zhang, Beijing (CN); Huaisong Zhu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 134 days.

(21) Appl. No.: 15/544,031

(22) PCT Filed: May 20, 2016

(86) PCT No.: PCT/CN2016/082775
§ 371 (c)(1),
(2) Date: Jul. 17, 2017

(87) PCT Pub. No.: WO2017/197634
PCT Pub. Date: Nov. 23, 2017

(65) Prior Publication Data
US 2018/0227084 A1    Aug. 9, 2018

(51) Int. Cl.
*H04L 1/18* (2006.01)
*H04L 1/06* (2006.01)
*H04L 5/00* (2006.01)
*H04W 72/12* (2009.01)

(52) U.S. Cl.
CPC .......... *H04L 1/1812* (2013.01); *H04L 1/0618* (2013.01); *H04L 5/0053* (2013.01); *H04W 72/1289* (2013.01)

(58) Field of Classification Search
CPC ....... H04L 1/1812; H04L 1/06; H04L 1/0618; H04L 1/08; H04L 1/0077; H04L 1/1819; H04L 1/1874; H04L 1/0009; H04L 1/0068; H04L 1/0071; H04L 1/1864; H04L 1/1825; H04L 1/1845; H04L 1/1642;
(Continued)

(56) References Cited

U.S. PATENT DOCUMENTS

2005/0063339 A1    3/2005  Jeong et al.
2006/0146745 A1    7/2006  Cai et al.
(Continued)

FOREIGN PATENT DOCUMENTS

CN    1801688 A1    7/2006

OTHER PUBLICATIONS

International Search Report and Written Opinion issued in Application No. PCT/CN2016/082775 dated Feb. 7, 2017, 8 pages.
(Continued)

*Primary Examiner* — Un C Cho
*Assistant Examiner* — Rasha K Fayed
(74) *Attorney, Agent, or Firm* — Sage Patent Group (57) ABSTRACT

The present disclosure provides methods and devices for robustness enhancement in a wireless communication system comprising a plurality of network nodes and a wireless communication device which is configured to be connected to the plurality of network nodes including a first network node. Embodiments disclosed herein describe a first network node, a wireless communication device, a method in the first network node, a method in the wireless communication device, a wireless communication system and a non-transitory machine-readable medium. The method in the first network node comprises the operations of transmitting a data packet to the wireless communication device; generating assistance information indicating to the wireless communication device when to search for the same data packet from at least a second network node of the plurality of network nodes for soft combination; and transmitting the assistance information to the wireless communication device.

33 Claims, 5 Drawing Sheets

(58) Field of Classification Search
CPC ...... H04L 1/1822; H04L 1/0001; H04L 1/18;
H04L 1/00; H04L 1/1893; H04L 1/0026;
H04L 1/1887; H04L 5/0035; H04L
5/0044; H04L 5/0053; H04L 5/00; H04L
5/0073; H04L 2001/0093; H04L 47/12;
H04L 41/0663; H04L 41/5012; H04L
41/0213; H04W 72/1289; H04W 72/082;
H04W 72/08; H04W 72/0426; H04W
84/02; H04W 52/40; H04B 7/022; H04B
7/024; H04B 17/16
See application file for complete search history.

(56) References Cited

U.S. PATENT DOCUMENTS

| | | | |
|---|---|---|---|
| 2007/0008990 A1* | 1/2007 | Torsner | H04L 1/1809 |
| | | | 370/473 |
| 2007/0064639 A1 | 3/2007 | Terasawa et al. | |
| 2008/0187136 A1* | 8/2008 | Zhang | H04L 1/1671 |
| | | | 380/270 |
| 2011/0075611 A1 | 3/2011 | Choi | |
| 2013/0272291 A1 | 10/2013 | Mukherjee et al. | |
| 2013/0294367 A1 | 11/2013 | Jalloul et al. | |
| 2015/0358952 A1 | 12/2015 | Feng et al. | |
| 2016/0227455 A1* | 8/2016 | Lei | H04W 36/08 |
| 2017/0141833 A1* | 5/2017 | Kim | H04B 7/0626 |
| 2017/0289936 A1* | 10/2017 | Chae | H04L 27/26 |

OTHER PUBLICATIONS

Maltsev, Alexander, "Channel Models for 60 GHz WLAN Systems", Intel: IEEE P802.11-09/0334r8, Wireless LANs, May 20, 2010, 152 pages.

Extended European Search Report dated Dec. 4, 2019 for European Patent Application No. 16902019.5, 9 pages.

* cited by examiner

METHODS AND DEVICES FOR ROBUSTNESS ENHANCEMENT IN A WIRELESS COMMUNICATION SYSTEM

CROSS REFERENCE TO RELATED APPLICATION(S)

This application is a 35 U.S.C. § 371 National Stage of International Patent Application No. PCT/CN2016/082775, filed May 20, 2016, designating the United States, the disclosure of which is incorporated by reference.

TECHNICAL FIELD

The present disclosure generally relates to a wireless communication system. More particularly, and not by way of limitation, particular embodiments of the present disclosure are directed to methods and devices for robustness enhancement in a wireless communication system.

BACKGROUND

For a wireless communication system in which a high frequency spectrum is used, the wireless propagation channel is vulnerable because it may be blocked by various obstacles on its paths. The various obstacles can include a human body, a tree-like thing and/or the like. As compared with the low or medium frequency channel, the high frequency channel would experience more frequent or faster fading and higher obstacle diffraction loss, which may reduce the robustness of the wireless communication system.

In a situation where the wireless propagation channel is totally blocked by such obstacles as a human body or a tree-like thing on its path, the interruption time can be in the level of hundreds of milliseconds, which cannot be solved by HARQ re-transmission which only provides time domain diversity in the level of tens of milliseconds. Thus, the traditional HARQ mechanism which provides time domain diversity is not feasible to the high frequency spectrum. Even though the re-transmission latency of the traditional HARQ mechanism could be extended to the level of hundreds of milliseconds, it would collide with the QoS requirement of latency for e.g., C-MTC traffic, which is undesirable.

In addition, in a wireless communication system where a high frequency spectrum is used, the requirement on reliability sometimes has priority over that on frequency efficiency. An example of such wireless communication system is a millimeter wave based communication system. As previously mentioned, the traditional HARQ mechanism which provides time domain diversity is not feasible to such wireless communication system.

SUMMARY

An object of the present disclosure is to improve the communication robustness in a wireless communication system where a high frequency spectrum is used.

As a solution, particular embodiments of the present disclosure provide methods and devices for robustness enhancement in a wireless communication system. The methods and devices introduce space domain diversity into the traditional HARQ mechanism design which only provides time domain diversity, which enables a wireless communication device to perform soft combination when being connected to more than one network node simultaneously.

Embodiments disclosed herein describe a first network node, a wireless communication device, a method in the first network node, a method in the wireless communication device, a wireless communication system and a non-transitory machine-readable medium.

One aspect is directed toward a method in a first network node for enabling soft combination in a wireless communication device, wherein the wireless communication device is connected to a plurality of network nodes including the first network node. The method comprises the operations of transmitting a data packet to the wireless communication device; generating assistance information indicating to the wireless communication device when to search for the same data packet from one or more second network nodes of the plurality of network nodes for soft combination; and transmitting the assistance information to the wireless communication device.

Another aspect is directed toward a first network node for enabling soft combination in a wireless communication device, wherein the wireless communication device is configured to be connected to a plurality of network nodes including the first network node. The first network node comprises a transmitting unit configured to transmit a data packet to the wireless communication device; and a generating unit configured to generate assistance information indicating to the wireless communication device when to search for the same data packet from one or more second network nodes of the plurality of network nodes for soft combination. The transmitting unit is further configured to transmit the assistance information to the wireless communication device.

Yet another aspect is directed toward a method in a wireless communication device for enabling soft combination, wherein the wireless communication device is connected to a plurality of network nodes. The method comprises the operations of receiving a data packet from a first network node or a second network node of the plurality of network nodes; receiving assistance information from the first network node indicating when to search for the same data packet from at least the second network node for soft combination; and searching for the same data packet for soft combination based on the assistance information.

Yet another aspect is directed toward a wireless communication device configured to be connected to a plurality of network nodes. The wireless communication device comprises a receiving unit configured to receive a data packet from a first network node or a second network node of the plurality of network nodes and receive assistance information from the first network node indicating when to search for the same data packet from at least the second network node for soft combination; and a searching unit configured to search for the same data packet for soft combination based on the assistance information.

Yet another aspect is directed toward a wireless communication system comprising a plurality of network nodes and a wireless communication device which is configured to be connected to the plurality of network nodes including a first network node. The first network node comprises a transmitting unit configured to transmit a data packet to the wireless communication device; and a generating unit configured to generate assistance information indicating to the wireless communication device when to search for the same data packet from one or more second network nodes of the plurality of network nodes for soft combination. The transmitting unit is further configured to transmit the assistance information to the wireless communication device. The wireless communication device comprises a receiving unit configured to receive the data packet from the first network node or the second network node and receive the assistance information from the first network node; and a searching unit configured to search for the same data packet for soft combination based on the assistance information.

Yet another aspect is directed toward a first network node. The first network node comprises a machine-readable storage medium having stored instructions therein; and a processor communicatively coupled to the machine-readable storage medium. The processor is configured to execute the instructions stored in the machine-readable storage medium to transmit a data packet to the wireless communication device; generate assistance information indicating to the wireless communication device when to search for the same data packet from one or more second network nodes of the plurality of network nodes for soft combination; and transmit the assistance information to the wireless communication device.

Yet another aspect is directed toward a wireless communication device. The wireless communication device comprises a machine-readable storage medium having stored instructions therein; and a processor communicatively coupled to the machine-readable storage medium. The processor is configured to execute the instructions stored in the machine-readable storage medium to receive a data packet from a first network node or a second network node of the plurality of network nodes; receive assistance information from the first network node indicating when to search for the same data packet from at least the second network node for soft combination; and search for the same data packet for soft combination based on the assistance information.

Yet another aspect is directed toward a non-transitory machine-readable medium having computer program codes stored therein, which, when executed by a set of one or more processors of a first network node, cause the first network node to transmit a data packet to the wireless communication device; generate assistance information indicating to the wireless communication device when to search for the same data packet from one or more second network nodes of the plurality of network nodes for soft combination; and transmit the assistance information to the wireless communication device.

Yet another aspect is directed toward a non-transitory machine-readable medium having computer program codes stored therein, which, when executed by a set of one or more processors of a wireless communication device, cause the wireless communication device to receive a data packet from a first network node or a second network node of the plurality of network nodes; receive assistance information from the first network node indicating when to search for the same data packet from at least the second network node for soft combination; and search for the same data packet for soft combination based on the assistance information.

The present disclosure can enable a wireless communication device to utilize space domain diversity in the multi-connectivity scenario so that the robustness can be enhanced in a wireless communication system.

BRIEF DESCRIPTION OF THE DRAWINGS

In the following section, the present disclosure will be described with reference to exemplary embodiments illustrated in the figures, in which.

DESCRIPTION OF EMBODIMENTS

In the following detailed description, numerous specific details are set forth in order to provide a thorough understanding of the disclosure. However, it will be understood by those skilled in the art that the present disclosure may be practiced without these specific details. In other instances, well-known methods, procedures, components and circuits have not been described in detail so as not to obscure the present disclosure. The device or system as disclosed may be implemented, for example, in hardware or a combination of hardware and software such as one or more processors executing computer program instructions stored on a memory device. It should be noted that various figures (including component diagrams) shown and discussed herein are for illustrative purpose only, and are not drawn to scale.

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including", "comprising" or "having" and variations thereof herein are meant to encompass the items listed thereafter and equivalents thereof as well as additional items. The terms "coupled" and "connected", along with their derivatives are not restricted to physical or mechanical connections, and can include electrical connections, whether direct or indirect. Furthermore, the terms "processor" and "circuit" may include either a single component or a plurality of components, which are either active and/or passive and are connected or otherwise coupled together to provide the described function.

References in the specification to "one embodiment", "an embodiment", "an exemplary embodiment" or the like, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
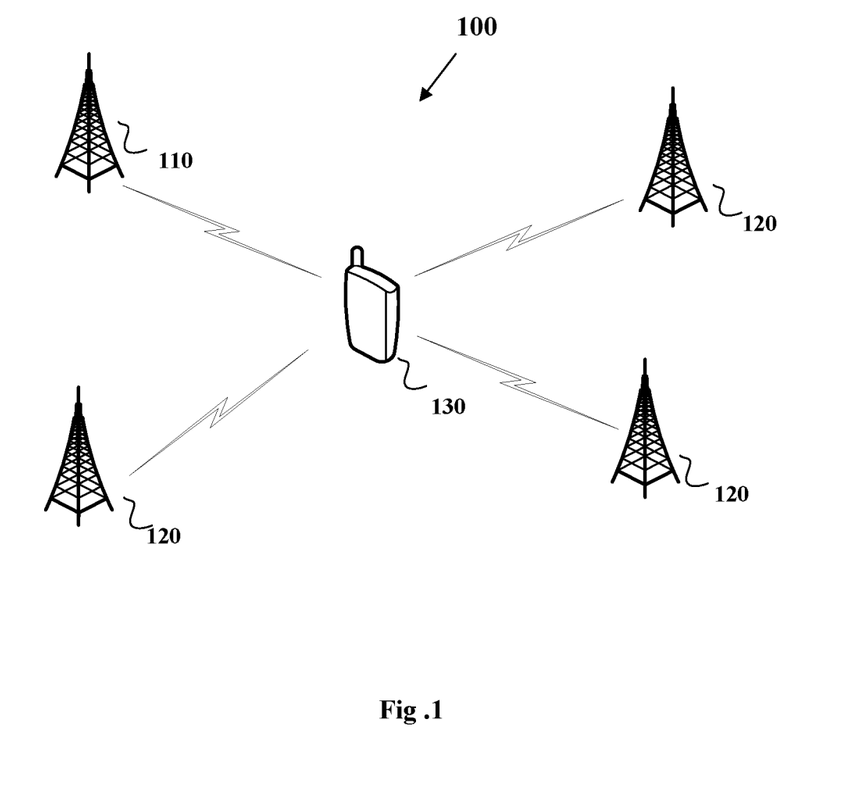
FIG. 1 is a simplified block diagram of an exemplary embodiment of a wireless communication system configured according to the present disclosure.

FIG. 1 is a simplified block diagram of an exemplary wireless communication system 100 in which one or more embodiments described herein may be implemented. The exemplary wireless communication system 100 comprises a plurality of network nodes 110, 120 and a wireless communication device 130 which is configured to be connected to the plurality of network nodes 110, 120. Although FIG. 1 shows four network nodes 110, 120 and one wireless communication device 130, it should be understood that the number of the network nodes 110, 120 or the wireless communication device 130 as shown in FIG. 1 is only illustrative, but not limiting. For example, the wireless communication system 100 may include at least two network nodes 110, 120 and at least one wireless communication device 130 served by the at least two network nodes 110, 120, wherein at least one network node operates at a high frequency spectrum which is above 6 GHz. The first network node 110 and the second network node 120 can include, but not limited to, an eNodeB and the wireless communication device 130 can include, but not limited to, a user equipment, which may be, e.g., a machine type communication device. An example of such wireless communication system 100 is a millimeter wave based communication system.

In the multi-connectivity scenario as shown in FIG. 1, the wireless communication device 130 is configured to keep connection with more than one network node 110, 120 simultaneously so as to utilize diversity gain. The network nodes 110, 120 involved in the multi-connectivity scenario may operate at the same RAT or different RATs. In a case where the network nodes 110, 120 operate at the same RAT, the RAT can be, but not limited to, the RAT used for the 5G communication system. In another case where the network nodes 110, 120 operate at different RATs, the RATs can be, but not limited to, the RAT used for the 5G communication system and the RAT used for the 4G communication system.

The network nodes 110, 120 are about to send same data packets to utilize diversity gain for reliability improvement instead of spectrum efficiency improvement. Generally, a smaller TTI is to be used for a higher frequency. When the TTI is smaller than the accuracy provided by the existing synchronization technology, the synchronization among the network nodes in the multi-connectivity scenario cannot be ensured. Due to backhaul latency and possible air interface timing difference, the network nodes 110, 120 involved in the multi-connectivity scenario are not synchronized with each other. In the case where the network nodes 110, 120 operate at different RATs, the data packets may be transmitted using different frequencies, different frame formats and/or different timings, which renders it difficult for the wireless communication device 130 to perform soft combination across multiple connections.

In order to enable the wireless communication device to perform soft combination across multiple connections, the present disclosure provides a solution in which the wireless communication device can search for downlink physical data on different connections for soft combination based on the assistance information from at least one of the network nodes.

Assume that the first network node 110 and the second network node 120 have a timing delay of x ms, wherein x might not be an integer. The two network nodes do not try to reduce the timing delay due to backhaul latency and possible air interface timing difference. Thus, the second network node 120 is x ms later than the first network node 110 to get the DL traffic. After the MAC layers of the first network node 110 and the second network node 120 have received the data from higher layers thereof, there is a relaxed (sub-) frame mapping between the two network nodes. The criterion for scheduling the data on each of the network nodes can be expressed as:

if the network node decides to send the data, it can schedule the data at any time within a scheduling window of y ms; and otherwise, the network node decides to abandon the data if it has not sent the data within the scheduling window of y ms.

The value of y should be selected so that there is no misunderstanding at the wireless communication device side, i.e., ensuring that two different data packets with the same HARQ process ID and the same NDI value cannot be soft-combined. For example, when RTT is 8 ms, which causes 8 HARQ processes, it takes 8 ms for the same HARQ process ID yet toggled NDI to appear on another network node and takes another 8 ms for the same HARQ process ID but NDI toggled back to appear on the other network node, which would cause ambiguity between different network nodes. In order to avoid such ambiguity, the value of y can be 8 ms.

The scheduling window for each network node can be:
pre-defined according to the system configuration; or
defined as specific to the network node according to the backhaul latency between the network node and at least another network node; or
defined as specific to the data packet, i.e., decided dynamically per data packet, wherein the scheduling window for the network node is decided by at least another network node when the other network node forwards the data packet to the network node.

Since there is no strict one to one mapping between (sub-)frame numbers of the first network node 110 and the second network node 120 but one to many mapping possibility, it relies on the wireless communication device 130 to search for the same HARQ process ID and the same NDI value between the two network nodes based on the assistance information generated at and transmitted from at least one of the network nodes. The assistance information may include information regarding a search window within which the wireless communication device 130 searches for the data transmission with the same HARQ process ID and the same NDI value between the two network nodes.

The determination of the search window is described as follows.

For each new data transmission, the network node where the data transmission comes from is considered as a "reference node" from timing perspective, e.g., the first network node 110. It should be noted that this is just a term used for explanation and does not mean to require standardized behaviour of the wireless communication device 130. The network node which helps the data transmission of the reference node, i.e., performs the same data transmission as the reference node, is considered as a "slave node", e.g., the second network node 120. The number of the slave nodes is not limited to one.

In an exemplary embodiment, the search window is indicated by $[(x-y_1)$ ms, $(x+y_2)$ ms], x ms representing a timing delay of the slave node in relative to the reference node, $y_1$ ms representing a first scheduling window within which the reference node schedules the data transmission with an HARQ process ID and an NDI value and $y_2$ ms representing a second scheduling window within which the slave node schedules the data transmission with the same HARQ process ID and the same NDI value, wherein $y_1$ and $y_2$ can be the same or different. In another exemplary embodiment, the second scheduling window for the salve node may be determined by the reference node, as mentioned in the situation where the scheduling window is defined as specific to a data packet.

The reference node can transmit the assistance information to the wireless communication device via:
broadcast signaling like SIB; or
dedicated signaling like RRC, MAC CE or PHY DCI.

In an exemplary embodiment, the assistance information may include:
from which network nodes the wireless communication device can expect the data packets for soft combination;
when the wireless communication device can start/stop the soft combination mode; and
when the soft combination mode is activated, how to set the search window to look for data packets used for soft combination from different network nodes.

The reference node can inform the wireless communication device of the search window itself or information from which the search window can be derived by the wireless communication device, e.g., the values of x, $y_1$ and $y_2$. In the case where x might not be an integer due to the air interface timing difference between the network nodes, floor/ceil (x) is used instead of x in the determination of the search window. The floor and ceil functions map a real number to the largest previous or the smallest following integer, respectively. Since the scheduling window can be specific to a network node or a data packet, the search window can be specific to a network node or a data packet accordingly.

The wireless communication device 130 decodes the control channel of the reference node to get the assistance information and the HARQ process ID and the NDI value of the data transmission. The assistance information includes information regarding a search window within which the wireless communication device 130 searches for the data transmission with the same HARQ process ID and the same NDI value from the salve node. Based on the information regarding the search window, the wireless communication device 130 searches for the data transmission with the same HARQ process ID and the same NDI value within the search window. The wireless communication device 130 decodes the control channel of the slave node to get the HARQ process ID and the NDI value of the data transmission from the slave node.

In an exemplary embodiment, for each new data transmission, when the new data transmission with an HARQ process ID and an NDI value is firstly received by the wireless communication device 130 from the reference node at 0 ms, the search window starts at $x-y_1$ ms and ends at $x+y_2$ ms. The wireless communication device 130 can stop searching for the data transmission with the same HARQ process ID and the same NDI value in the search window once the data transmission is correctly received or a toggled NDI appears on the salve node or the reference node.

In another exemplary embodiment, for each new data transmission, when the new data transmission with an HARQ process ID and an NDI value is firstly received by the wireless communication device 130 from the slave node at 0 ms, the search window starts at $-x-y_1$ ms and ends at $-x+y_2$ ms. The wireless communication device 130 can stop searching for the data transmission with the same HARQ process ID and the same NDI value in the search window once the data transmission is correctly received or a toggled NDI appears on the reference node or the slave node.

The wireless communication device 130 can determine which one of the search window indicated by [$(x-y_1)$ ms, $(x+y_2)$ ms] and the search window indicated by [$(-x-y_1)$ ms, $(-x+y_2)$ ms] is used without requiring further indication from the network side.

It is to be noted that the search window as indicated by [$(x-y_1)$ ms, $(x+y_2)$ ms] or [$(-x-y_1)$ ms, $(-x+y_2)$ ms] is the largest search window for the wireless communication device 130. The search window can be smaller for the wireless communication device 130. For example, the search window can be [0 ms, $(-x+y_2)$ ms].

The above exemplary embodiments involve the situation where the first network node 110 and the second network node 120 have a timing delay of x ms therebetween and the network side does not try to reduce the timing delay, wherein x might not be an integer. For these exemplary embodiments, there is no requirement on the synchronization between the first network node 110 and the second network node 120 or the scheduler coordination therebetween.

For the situation where the first network node 110 and the second network node 120 have a timing delay of x ms therebetween and the network side tries to reduce the timing delay due to backhaul latency and possible air interface timing difference, wherein x might not be an integer, the following exemplary embodiments are described.

In an exemplary embodiment, the time alignment is performed at the network side. For example, the first network node 110 tries to send data to the second network node 120 in advance and tries to perform physical layer transmission of the data at x ms later. As a result, the timing mismatch between the different network nodes can be reduced and a strict mapping can exist between (sub-)frame numbers of the different network nodes. One case is that the timing delay between the two network nodes would be limited to less than one TTI.

When there is a strict mapping between (sub-)frame numbers of the first network node 110 and the second network node 120, only the same HARQ process ID and the same NDI value will appear in the mapped (sub-)frames of the two network nodes. The examples of the strict mapping between (sub-)frame numbers of the first network node 110 and the second network node 120 can be as follows:
when the first network node 110 and the second network node 120 have different TTI lengths, e.g., $TTI_1=2TTI_2$, one (sub-)frame of the first network node 110 can be mapped to two (sub-)frames of the second network node 120; or when the first network node 110 and the second network node 120 have the same
TTI length, i.e., $TTI_1=TTI_2$, one (sub-)frame of the first network node 110 can be mapped to one (sub-)frame of the second network node 120; or
the mapping can be in different levels, e.g., a TTI of the first network node 110 can be mapped to a symbol of the second network node 120.

Since there is a strict mapping between (sub-)frame numbers of the first network node 110 and the second network node 120, the assistance information generated at and transmitted from at least one of the network nodes may include information regarding a time point at which the wireless communication device 130 searches for the data transmission with the same HARQ process ID and the same NDI value between the two network nodes. In an exemplary embodiment, the information regarding the time point includes a timing delay of the second network node 120 in relative to the first network node 110, the timing delay being denoted by x ms. In the case where x might not be an integer due to the air interface timing difference between the network nodes, floor/ceil (x) is used instead of x.

The wireless communication device 130 decodes the control channel of at least one of the first network node 110 and the second network node 120 to get the assistance information. The assistance information includes information regarding a time point at which the wireless communication device 130 searches for the data transmission with the same HARQ process ID and the same NDI value between the two network nodes. In an exemplary embodiment, knowing x ms from the network side, the wireless communication device 130 can derive the mapping between the first network node 110 and the second network node 120.

If both the first network node 110 and the second network node 120 have the same data transmission to the wireless communication device 130, the wireless communication device 130 will benefit from soft combination because only the same HARQ process ID and the same NDI value will appear in the mapped (sub-)frames of the two network nodes.

If there is a mismatch between the first network node 110 and the second network node 120, i.e., different HARQ process IDs and different NDI values appear on the mapped (sub-)frames of the two network nodes, it will be considered as a network error and the buffer of the related HARQ process(es) will be cleared.

The present disclosure provides a method at the first network node 110 to generate and transmit assistance information to the wireless communication device 130, indicating the time period within which or the time point at which the transport block from at least one second network node 120 involved in the multi-connectivity scenario can be found and soft combined with the transport block from the first network node 110.

Figure 2:
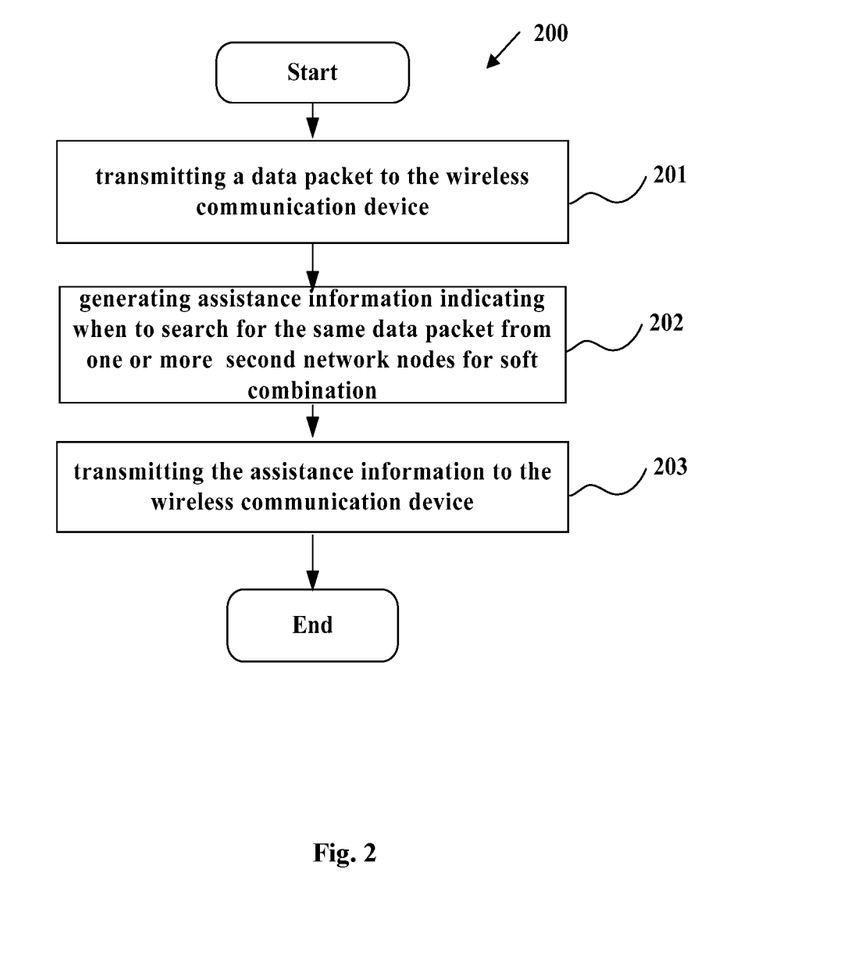
FIG. 2 is a flow diagram showing an exemplary embodiment of a method in a first network node for enabling soft combination in a wireless communication device.

FIG. 2 is a flow diagram showing an exemplary embodiment of a method 200 in the first network node 110 for enabling soft combination in the wireless communication device 130, wherein the wireless communication device 130 is connected to the first network node 110 and one or more second network nodes 120.

In step 201, the first network node 110 transmits a data packet to the wireless communication device 130. One or more second network nodes 120 transmit the data packet to the wireless device 130.

In step 202, the first network node 110 generates assistance information indicating to the wireless communication device 130 when to search for the same data packet from one or more second network nodes 120 for soft combination.

In step 203, the first network node 110 transmits the assistance information to the wireless communication device 130.

It is to be understood that the transmission of the data packet and the transmission of the assistance information can be independent with each other. It is also to be understood that the numbers of the steps, such as 201, 202 and 203, do not mean to set limitations on the order of the steps and the order of the steps can be varied depending on circumstances.

The present disclosure also provides a method at the wireless communication device 130 to receive assistance information from the first network node 110, indicating the time period within which or the time point at which the transport block from at least one second network node 120 involved in the multi-connectivity scenario can be found and soft combined with the transport block from the first network node 110.

Figure 3:
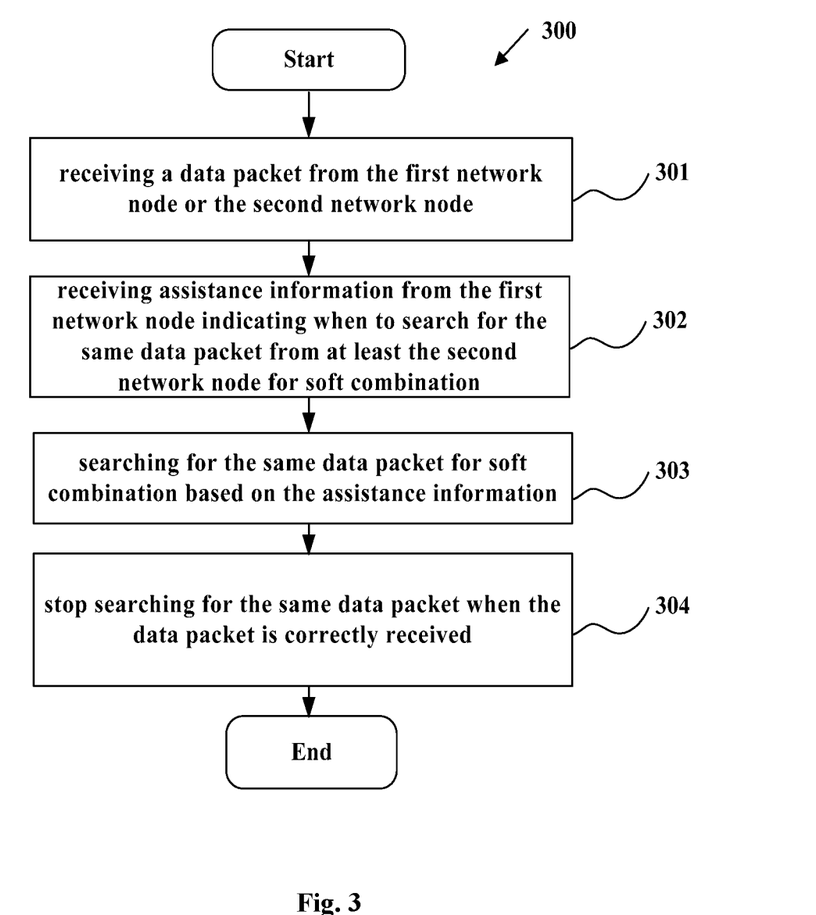
FIG. 3 is a flow diagram showing an exemplary embodiment of a method in a wireless communication device for enabling soft combination.

FIG. 3 is a flow diagram showing an exemplary embodiment of a method 300 in the wireless communication device 130 for enabling soft combination, wherein the wireless communication device 130 is connected to the first network node 110 and one or more second network nodes 120.

In step 301, the wireless communication device 130 receives a data packet from the first network node 110 or the second network node 120.

In step 302, the wireless communication device 130 receives assistance information from the first network node 110 indicating when to search for the same data packet from at least the second network node 120 for soft combination.

In step 303, the wireless communication device 130 searches for the same data packet for soft combination based on the assistance information.

In step 304, the wireless communication device 130 stops searching for the same data packet in the search window when the data packet is correctly received.

It is to be understood that the receipt of the data packet and the receipt of the assistance information can be independent with each other. It is also to be understood that the numbers of the steps, such as 301, 302, 303 and 304, do not mean to set limitations on the order of the steps and the order of the steps can be varied depending on circumstances.

The present disclosure further provides a first network node 110 configured to generate and transmit assistance information to the wireless communication device 130, indicating the time period within which or the time point at which the transport block from at least one second network node 120 involved in the multi-connectivity scenario can be found and soft combined with the transport block from the first network node 110, wherein the wireless communication device 130 is configured to be connected to the first network node 110 and one or more second network nodes 120.

Figure 4:
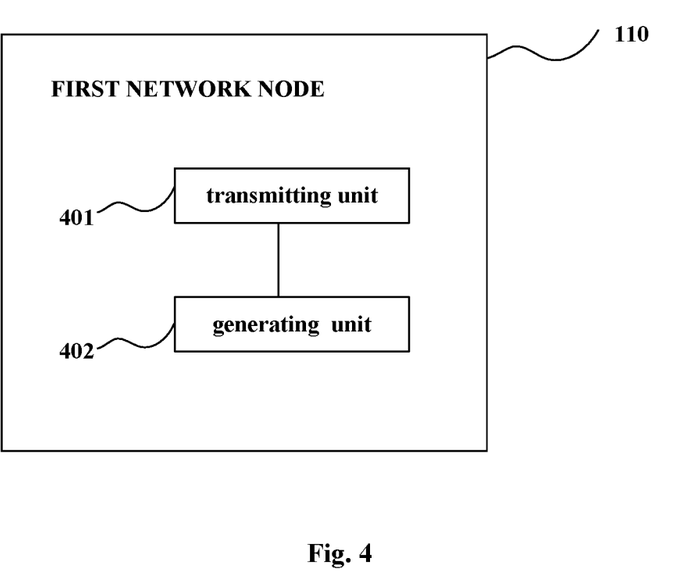
FIG. 4 is a simplified block diagram of an exemplary embodiment of a first network node configured according to the present disclosure.

FIG. 4 is a simplified block diagram of an exemplary embodiment of the first network node 110 configured according to the present disclosure. As shown, the first network node 110 comprises a transmitting unit 401 configured to transmit a data packet to the wireless communication device 130; and a generating unit 402 configured to generate assistance information indicating to the wireless communication device 130 when to search for the same data packet from one or more second network nodes 120 for soft combination. The transmitting unit 401 is further configured to transmit the assistance information to the wireless communication device 130.

Figure 5:
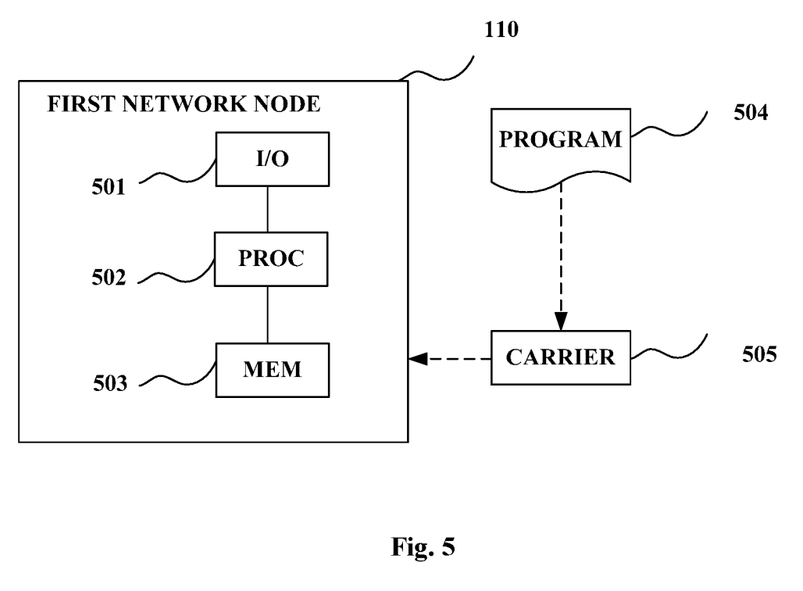
FIG. 5 is a simplified block diagram of another exemplary embodiment of a first network node configured according to the present disclosure.

FIG. 5 is a simplified block diagram of another exemplary embodiment of the first network node 110 configured according to the present disclosure. As shown, the first network node 110 comprises a machine-readable storage medium (shown as MEM) 503 having stored instructions therein; and a processor (shown as PROC) 502 communicatively coupled to the MEM 503. The PROC 502 is configured to execute the instructions stored in the MEM 503 to at least perform the method as shown in FIG. 2. The first network node 110 also includes an Input/Output Interface (shown as I/O) 501. The MEM 503, the PROC 502 and the I/O 501 are operatively coupled with each other.

In an exemplary embodiment, the MEM 503 may be configured to store a computer program, which when executed by the PROC(s) 502, causes the PROC(s) 502 to at least perform the method as shown in FIG. 2. The computer program can be stored in a remote location, for example computer program product 504, and be accessible by the PROC(s) 502 via, for example the carrier 505.

The present disclosure further provides a wireless communication device 130 configured to receive assistance information from the first network node 110, indicating the time period within which or the time point at which the transport block from at least one second network node 120 involved in the multi-connectivity scenario can be found and soft combined with the transport block from the first network node 110, wherein the wireless communication device 130 is configured to be connected to the first network node 110 and one or more second network nodes 120.

Figure 6:
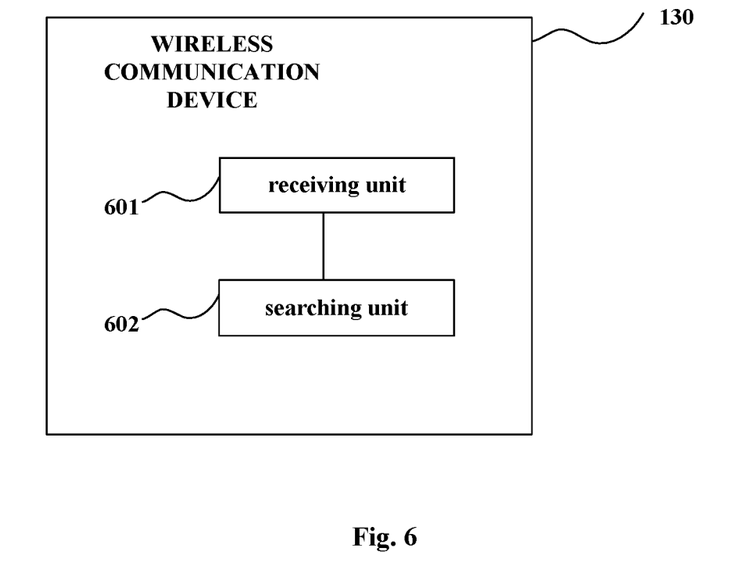
FIG. 6 is a simplified block diagram of an exemplary embodiment of a wireless communication device configured according to the present disclosure.

FIG. 6 is a simplified block diagram of an exemplary embodiment of the wireless communication device 130 configured according to the present disclosure. As shown, the wireless communication device 130 comprises a receiving unit 601 configured to receive a data packet from the first network node 110 or the second network node 120 and receive assistance information from the first network node 110 indicating when to search for the same data packet from at least the second network node 120 for soft combination; and a searching unit configured to search for the same data packet based on the assistance information.

Figure 7:
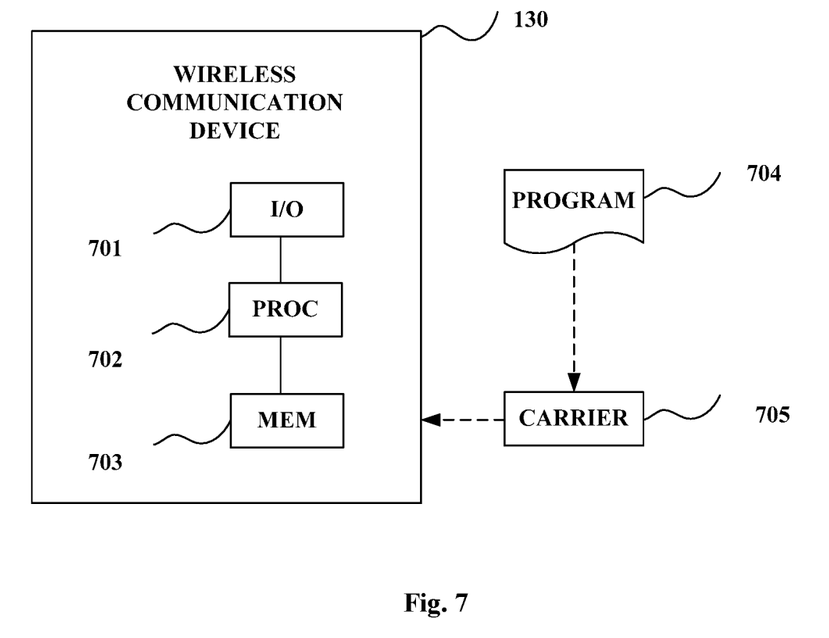
FIG. 7 is a simplified block diagram of another exemplary embodiment of a wireless communication device configured according to the present disclosure.

FIG. 7 is a simplified block diagram of another exemplary embodiment of the wireless communication device 130 configured according to the present disclosure. As shown, the wireless communication device 130 comprises a machine-readable storage medium (shown as MEM) 703 having stored instructions therein; and a processor (shown as PROC) 702 communicatively coupled to the MEM 703. The PROC 702 is configured to execute the instructions stored in the MEM 703 to at least perform the method as shown in FIG. 3. The wireless communication device 130 also includes an Input/Output Interface (shown as I/O) 701. The MEM 703, the PROC 702 and the I/O 701 are operatively coupled with each other.

In an exemplary embodiment, the MEM 703 may be configured to store a computer program, which when executed by the PROC(s) 702, causes the PROC(s) 702 to at least perform the method as shown in FIG. 3. The computer program can be stored in a remote location, for example computer program product 704, and be accessible by the PROC(s) 702 via, for example the carrier 705.

The exemplary embodiments of the present disclosure can enable a wireless communication device to utilize the soft combining gain among multiple connections with multiple network nodes so as to improve the robustness of a wireless communication system in which a high frequency spectrum above 6 GHz is used.

Throughout the description, embodiments of the present disclosure have been presented through flow diagrams. It will be appreciated that the order of operations or steps described in these flow diagrams are only intended for illustrative purposes and not intended as a limitation of the present disclosure. Modifications and other embodiments of the disclosure will come to mind to one skilled in the art having the benefit of the teachings presented in the foregoing descriptions and the associated drawings. Therefore, it is to be understood that the disclosure is not to be limited to the specific embodiments as disclosed and that modifications and other embodiments are intended to be included within the scope of this disclosure. Although specific terms may be employed herein, they are used in a generic and descriptive sense only and not for purposes of limitation. Accordingly, the scope of patented subject matter should not be limited to any of the specific exemplary teachings discussed above, but is instead defined by the following claims.

ABBREVIATIONS

CE Control Element
C-MTC Critical Machine Type Communication
DCI Downlink Control Information
DL DownLink
ID IDentification
HARQ Hybrid Automatic Repeat reQuest
MAC Media Access Control
NDI New Data Indicator
PHY PHYsical
QoS Quality of Service
RAT Radio Access Technology
RRC Radio Resource Control
RTT Round Trip Time
SIB System Information Block
TTI Transmission Time Interval
UE User Equipment
4G fourth generation
5G fifth generation

The invention claimed is:

1. A method in a first network node for enabling soft combination in a wireless communication device, wherein the wireless communication device is connected to a plurality of network nodes including the first network node, the method comprising:
transmitting a data packet to the wireless communication device;
generating assistance information indicating to the wireless communication device when to search for the same data packet from one or more second network nodes of the plurality of network nodes for soft combination, the assistance information includes information regarding a search window within which the wireless communication device searches for the same data packet from the second network node; and
transmitting the assistance information to the wireless communication device,
wherein the search window is indicated by [(x−y1) ms, (x+y2) ms], x ms representing a timing delay of the second network node in relative to the first network node, y1 ms representing a first scheduling window within which the first network node schedules the data packet and y2 ms representing a second scheduling window within which the second network node schedules the same data packet, wherein y1 and y2 can be the same or different.

2. The method of claim 1, wherein when the first network node and the second network node transmit the same data packet to the wireless communication device in an asynchronous manner.

3. The method of claim 2, wherein the information regarding the search window is the search window itself.

4. The method of claim 2, wherein the information regarding the search window is used by the wireless communication device to derive the search window.

5. The method of claim 1, wherein the second scheduling window is determined by the first network node.

6. The method of claim 1, wherein when the first network node and the second network node transmit the same data packet to the wireless communication device in a synchronous manner, the assistance information includes information regarding a time point at which the wireless communication device searches for the same data packet from the second network node.

7. The method of claim 6, wherein the information regarding the time point includes a timing delay of the second network node in relative to the first network node, the timing delay being denoted by x ms.

8. The method of claim 1, wherein x ms is floor/ceil (x) ms when x is not an integer.

9. The method of claim 1, wherein the wireless communication device can be a user equipment and the radio access techniques used by the plurality of network nodes can be the same or different.

10. A first network node for enabling soft combination in a wireless communication device, wherein the wireless communication device is configured to be connected to a plurality of network nodes including the first network node, the first network node comprising:
a transmitter operable to transmit a data packet to the wireless communication device; and
processing circuitry configured to generate assistance information indicating to the wireless communication device when to search for the same data packet from one or more second network nodes of the plurality of network nodes for soft combination, the assistance information includes information regarding a search window within which the wireless communication device is configured to search for the same data packet from the second network node, wherein the processing circuitry is further configured to employ the transmitter to transmit the assistance information to the wireless communication device,
wherein the search window is indicated by [(x−y1) ms, (x+y2) ms], x ms representing a timing delay of the second network node in relative to the first network node, y1 ms representing a first scheduling window within which the first network node is configured to schedule the data packet and y2 ms representing a second scheduling window within which the second network node is configured to schedule the same data packet, wherein y1 and y2 can be the same or different.

11. The first network node of claim 10, wherein when the first network node and the second network node are configured to transmit the same data packet to the wireless communication device in an asynchronous manner.

12. The first network node of claim 11, wherein the information regarding the search window is the search window itself.

13. The first network node of claim 11, wherein the information regarding the search window is used by the wireless communication device to derive the search window.

14. The first network node of claim 10, wherein the second scheduling window is determined by the first network node.

15. The first network node of claim 10, wherein when the first network node and the second network node are configured to transmit the same data packet to the wireless communication device in a synchronous manner, the assistance information includes information regarding a time point at which the wireless communication device is configured to search for the same data packet from the second network node.

16. The first network node of claim 15, wherein the information regarding the time point includes a timing delay of the second network node in relative to the first network node, the timing delay being denoted by x ms.

17. The first network node of claim 10, wherein x ms is floor/ceil (x) ms when x is not an integer.

18. The first network node of claim 10, wherein the first network node can use the same radio access technique as the second network node or can use a different radio access technique from the second network node.

19. A method in a wireless communication device for enabling soft combination, wherein the wireless communication device is connected to a plurality of network nodes, the method comprising:
receiving a data packet from a first network node or a second network node of the plurality of network nodes;
receiving assistance information from the first network node indicating when to search for the same data packet from at least the second network node for soft combination, the assistance information includes information regarding a search window within which the wireless communication device searches for the same data packet from the second network node; and
searching for the same data packet for soft combination based on the assistance information,
wherein when the data packet is firstly received by the wireless communication device from the first network node at 0 ms, the wireless communication device uses the search window to search for the data packet from the second network node which starts at x−y1 ms and ends at x+y2 ms; and when the data packet is firstly received by the wireless communication device from the second network node at 0 ms, the wireless communication device uses the search window to search for the data packet from the first network node which starts at −x−y1 ms and ends at −x+y2 ms, x ms representing a timing delay of the second network node in relative to the first network node, y1 ms representing a first scheduling window within which the first network node schedules the data packet and y2 ms representing a second scheduling window within which the second network node schedules the same data packet, wherein y1 and y2 can be the same or different.

20. The method of claim 19, wherein when the first network node and the second network node transmit the same data packet to the wireless communication device in an asynchronous manner.

21. The method of claim 20, further comprising stopping searching for the same data packet in the search window when the data packet is correctly received.

22. The method of claim 19, wherein when the first network node and the second network node transmit the same data packet to the wireless communication device in a synchronous manner, the assistance information includes information regarding a time point at which the wireless communication device searches for the same data packet from the second network node.

23. The method of claim 19, wherein the wireless communication device can be a user equipment and the radio access techniques used by the plurality of network nodes can be the same or different.

24. A wireless communication device, the wireless communication device being configured to be connected to a plurality of network nodes and comprising:
a receiver operable to receive a data packet from a first network node or a second network node of the plurality of network nodes and receive assistance information from the first network node indicating when to search for the same data packet from at least the second network node for soft combination, the assistance information includes information regarding a search window within which the wireless communication device is configured to search for the same data packet from the second network node; and
processing circuitry configured to search for the same data packet for soft combination based on the assistance information, wherein when the data packet is firstly received by the wireless communication device from the first network node at 0 ms, the wireless communication device uses the search window to search for the data packet from the second network node which starts at x−y1 ms and ends at x+y2 ms; and when the data packet is firstly received by the wireless communication device from the second network node at 0 ms, the wireless communication device uses the search window to search for the data packet from the first network node which starts at −x−y1 ms and ends at −x+y2 ms, x ms representing a timing delay of the second network node in relative to the first network node, y1 ms representing a first scheduling window within which the first network node schedules the data packet and y2 ms representing a second scheduling window within which the second network node schedules the same data packet, wherein y1 and y2 can be the same or different.

25. The wireless communication device of claim 24, wherein when the first network node and the second network node are configured to transmit the same data packet to the wireless communication device in an asynchronous manner.

26. The wireless communication device of claim 25, wherein processing circuitry is configured to stop searching for the same data packet in the search window when the data packet is correctly received.

27. The wireless communication device of claim 24, wherein when the first network node and the second network node are configured to transmit the same data packet to the wireless communication device in a synchronous manner, the assistance information includes information regarding a time point at which the wireless communication device is configured to search for the same data packet from the second network node.

28. The wireless communication device of claim 24, wherein the wireless communication device can be a user equipment.

29. A wireless communication system comprising a plurality of network nodes and a wireless communication device which is configured to be connected to the plurality of network nodes, the plurality of network nodes including a first network node according to claim 10.

30. A first network node comprising:
   a machine-readable storage medium having stored instructions therein; and
   a processor communicatively coupled to the machine-readable storage medium, the processor configured to execute the instructions stored in the machine-readable storage medium to perform the method according to claim 1.

31. A wireless communication device comprising:
   a machine-readable storage medium having stored instructions therein; and
   a processor communicatively coupled to the machine-readable storage medium, the processor configured to execute the instructions stored in the machine-readable storage medium to perform the method according to claim 19.

32. A non-transitory machine-readable medium having computer program codes stored therein, which, when executed by a set of one or more processors of a first network node, cause the first network node to perform a method according to claim 1.

33. A non-transitory machine-readable medium having computer program codes stored therein, which, when executed by a set of one or more processors of a wireless communication device, cause the wireless communication device to perform a method according to claim 19.

* * * * *